United States Patent
Kozloski et al.

(10) Patent No.: US 9,852,646 B2
(45) Date of Patent: Dec. 26, 2017

(54) PROVIDING QUESTION ANSWERING RESPONSES TO HOW-TO PROCEDURAL QUESTIONS

(71) Applicant: International Business Machines Corporation, Armonk, NY (US)

(72) Inventors: James R. Kozloski, New Fairfield, CT (US); Clifford A. Pickover, Yorktown Heights, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 14/740,336

(22) Filed: Jun. 16, 2015

(65) Prior Publication Data

US 2016/0371992 A1    Dec. 22, 2016

(51) Int. Cl.
*G09B 5/00* (2006.01)
*G09B 5/06* (2006.01)
*G09B 5/02* (2006.01)

(52) U.S. Cl.
CPC .............. *G09B 5/065* (2013.01); *G09B 5/02* (2013.01)

(58) Field of Classification Search
CPC .. G09B 5/00; G09B 5/06; G09B 5/065; G06F 9/4446
See application file for complete search history.

(56) References Cited

U.S. PATENT DOCUMENTS

| | | | |
|---|---|---|---|
| 4,658,370 A | 4/1987 | Erman et al. | |
| 5,471,560 A | 11/1995 | Allard et al. | |
| 2011/0105859 A1* | 5/2011 | Popovic | A61B 5/0205 600/301 |
| 2012/0052476 A1* | 3/2012 | Graesser | G09B 7/04 434/362 |
| 2012/0209841 A1* | 8/2012 | Saretto | G06F 17/218 707/736 |
| 2012/0282577 A1* | 11/2012 | Chen | G09B 19/00 434/155 |
| 2013/0117204 A1 | 5/2013 | Vadlamani et al. | |
| 2013/0283162 A1 | 10/2013 | Aronsson et al. | |
| 2014/0223462 A1 | 8/2014 | Aimone et al. | |

(Continued)

FOREIGN PATENT DOCUMENTS

| | | | | |
|---|---|---|---|---|
| WO | 2014115147 A1 | 7/2014 | | |
| WO | WO 2015027079 A1 * | 2/2015 | | G09B 7/02 |

*Primary Examiner* — Peter Egloff
(74) *Attorney, Agent, or Firm* — Yee & Associates, P.C.; Yeen Tham

(57) ABSTRACT

Selecting an instructional video is provided. It is determined that a query is requesting information on how to perform a procedure. A set of instructional videos are accessed corresponding to the information on how to perform the procedure. Information regarding a user of a client device that submitted the query is retrieved from at least one of a set of databases and a set of monitoring devices located on the user via a network. Physiological changes are predicted in the user's current cognitive state based on the information regarding the user retrieved from the set of databases and the set of monitoring devices. An instructional video is selected in the set of instructional videos corresponding to the information on how to perform the procedure based on the user's current cognitive state indicated in the retrieved information regarding the user of the client device.

14 Claims, 7 Drawing Sheets

(56) References Cited

U.S. PATENT DOCUMENTS

2014/0298162 A1\* 10/2014 Cohen ............... G09B 5/02
 715/234
2015/0046822 A1\* 2/2015 Kitch ................ G09B 5/02
 715/721

\* cited by examiner

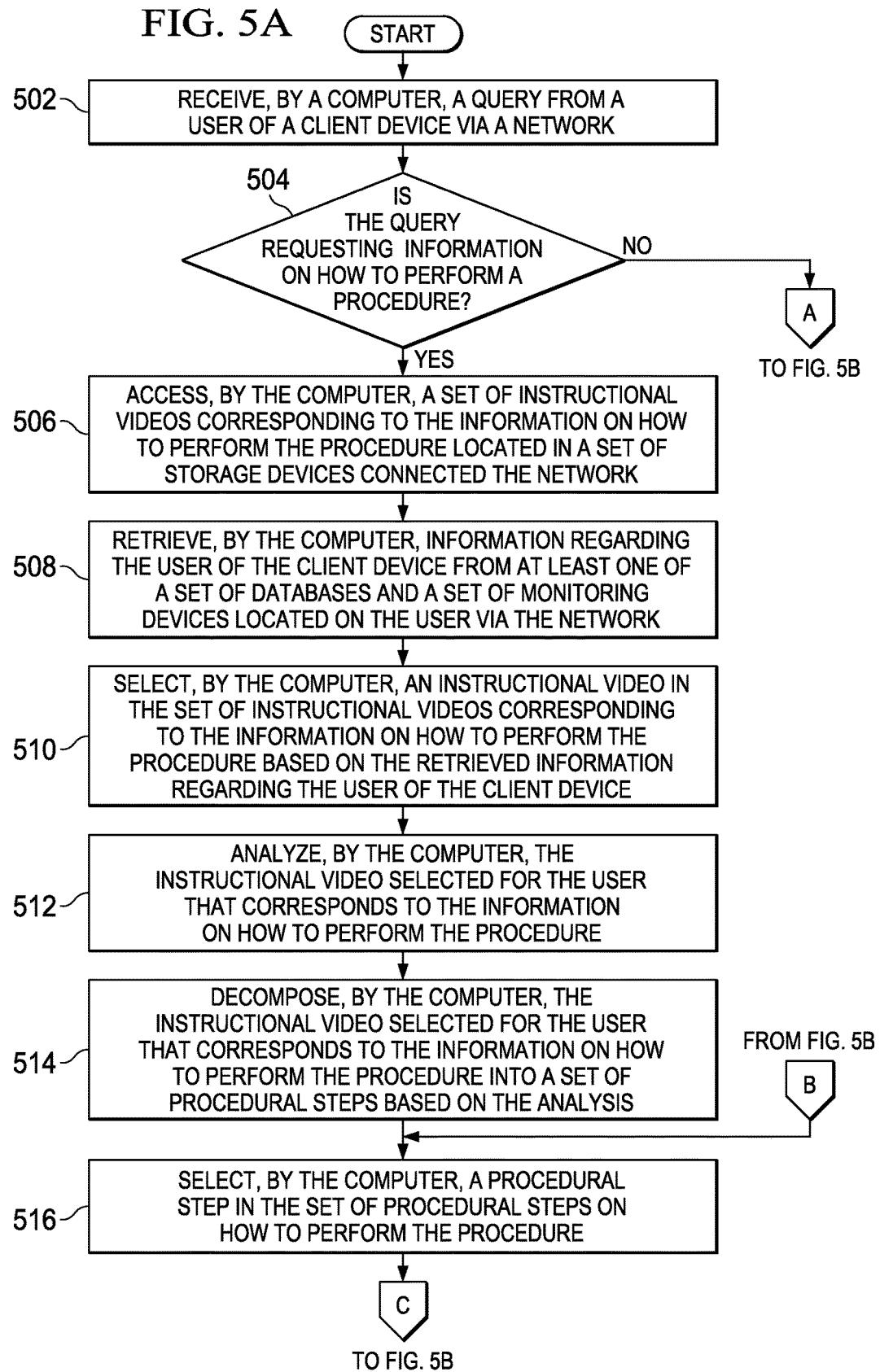

PROVIDING QUESTION ANSWERING RESPONSES TO HOW-TO PROCEDURAL QUESTIONS

BACKGROUND

1. Field

The disclosure relates generally to a question answering system and more specifically to a question answering system that provides a response to a how-to procedural question using a set of instructional videos selected for a particular client device user based on retrieved information corresponding to that particular client device user.

2. Description of the Related Art

People who use question and answering systems will often seek answers to how-to procedural questions or questions related to procedural knowledge that are best conveyed by a set of instructions or videos showing a sequence of steps. For example, a user may desire to better understand how to change a tire, how to bake an angel-food cake, how to play a certain chord on a guitar, how to solve a plumbing problem, or how to tie a tie. Even experts or specialists in a field, such as, for example, surgeons, often need to find and review procedural knowledge.

SUMMARY

According to one illustrative embodiment, a computer-implemented method for selecting an instructional video is provided. A computer determines that a query is requesting information on how to perform a procedure. The computer accesses a set of instructional videos corresponding to the information on how to perform the procedure. The computer retrieves information regarding a user of a client device that submitted the query requesting the information on how to perform a procedure. The information regarding the user of the client device is retrieved from at least one of a set of databases and a set of monitoring devices located on the user via a network. The computer predicts physiological changes in the user's current cognitive state based on the information regarding the user retrieved from the set of databases and the set of monitoring devices located on the user. The computer selects an instructional video in the set of instructional videos corresponding to the information on how to perform the procedure based on the user's current cognitive state indicated in the retrieved information regarding the user of the client device.

According to another illustrative embodiment, a computer system for selecting an instructional video is provided. The computer system includes a bus system, a storage device that stores program instructions connected to the bus system, and a processor that executes the program instructions connected to the bus system. The computer system determines that a query is requesting information on how to perform a procedure. The computer system accesses a set of instructional videos corresponding to the information on how to perform the procedure. The computer system retrieves information regarding a user of a client device that submitted the query requesting the information on how to perform a procedure. The information regarding the user of the client device is retrieved from at least one of a set of databases and a set of monitoring devices located on the user via a network. The computer system predicts physiological changes in the user's current cognitive state based on the information regarding the user retrieved from the set of databases and the set of monitoring devices located on the user. The computer system selects an instructional video in the set of instructional videos corresponding to the information on how to perform the procedure based on the user's current cognitive state indicated in the retrieved information regarding the user of the client device.

According to another illustrative embodiment, a computer program product for selecting an instructional video is provided. The computer program product includes a computer readable storage medium that has program instructions embodied therewith. The program instructions are executable by a computer. The computer determines that a query is requesting information on how to perform a procedure. The computer accesses a set of instructional videos corresponding to the information on how to perform the procedure. The computer retrieves information regarding a user of a client device that submitted the query requesting the information on how to perform a procedure. The information regarding the user of the client device is retrieved from at least one of a set of databases and a set of monitoring devices located on the user via a network. The computer predicts physiological changes in the user's current cognitive state based on the information regarding the user retrieved from the set of databases and the set of monitoring devices located on the user. The computer selects an instructional video in the set of instructional videos corresponding to the information on how to perform the procedure based on the user's current cognitive state indicated in the retrieved information regarding the user of the client device.

BRIEF DESCRIPTION OF THE DRAWINGS

FIGS. 5A-5B are a flowchart illustrating a process for generating a playlist graph of selected videos for a particular user in accordance with an illustrative embodiment.

DETAILED DESCRIPTION

Figure 1:
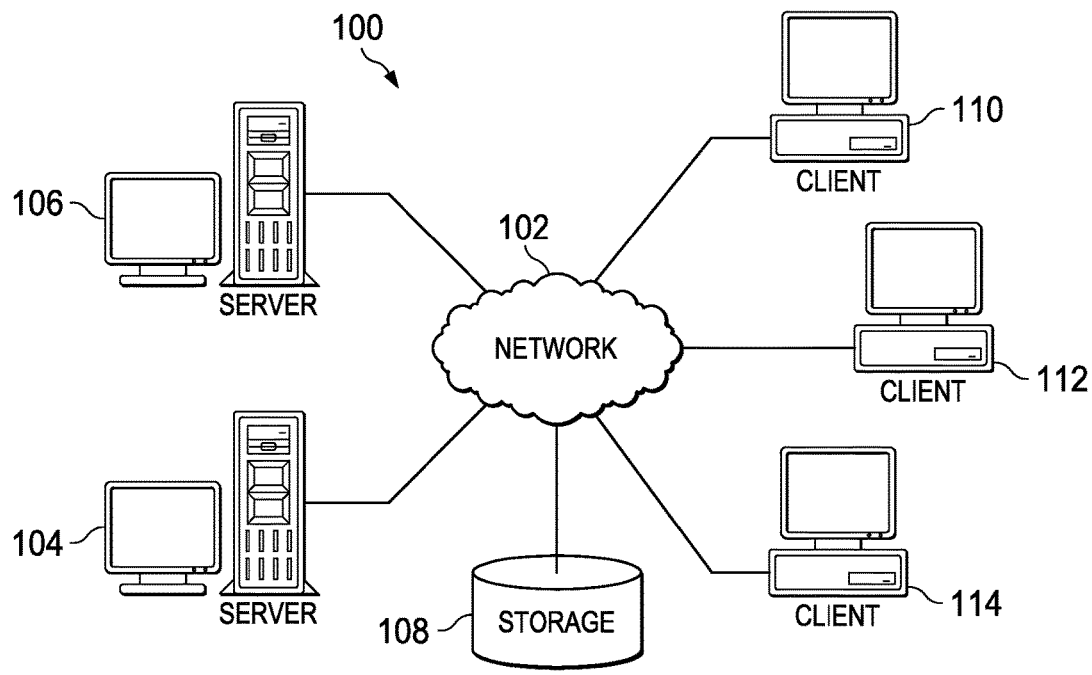
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
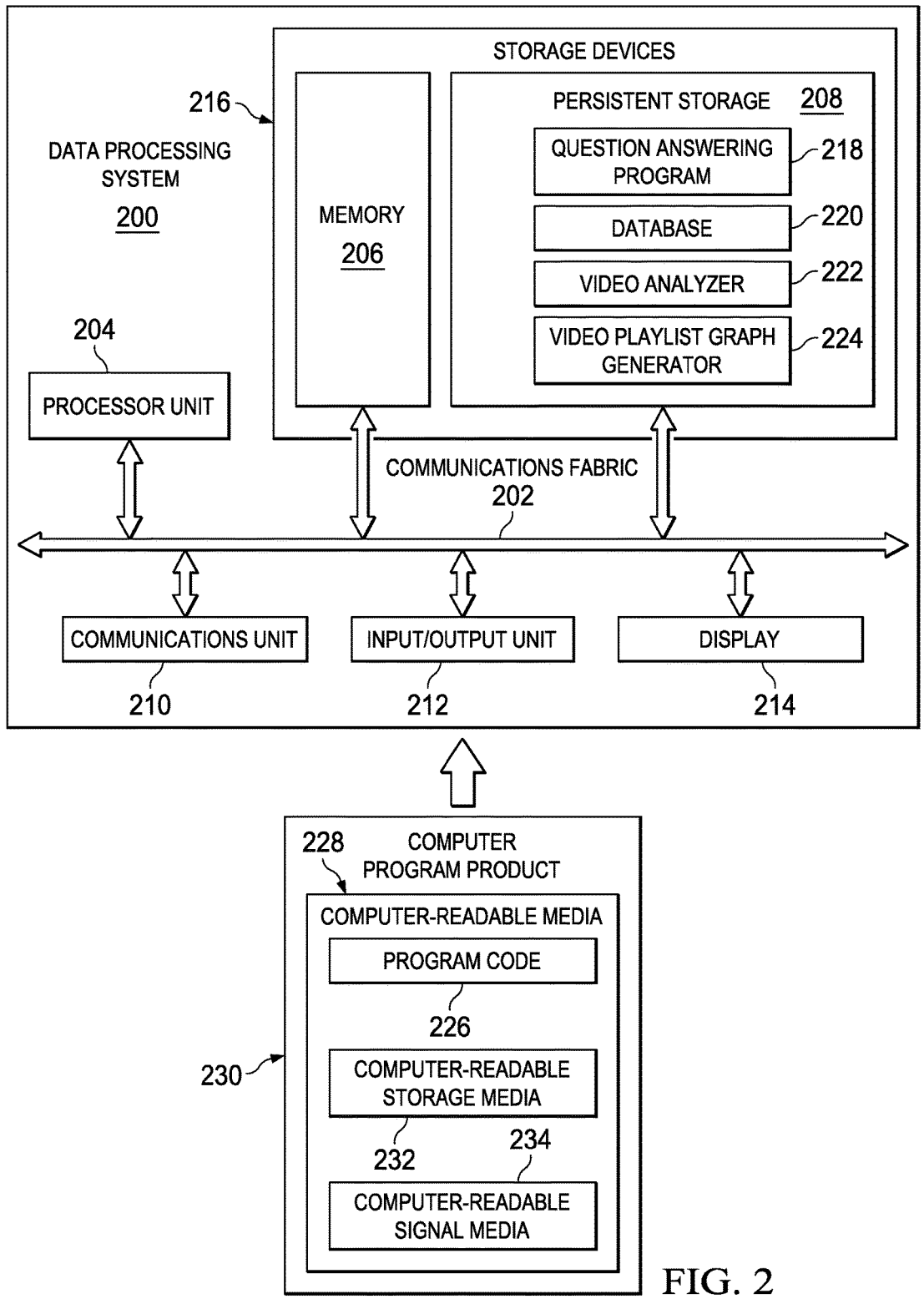
FIG. 2 is a diagram of a data processing system in which illustrative embodiments may be implemented.
Figure 3:
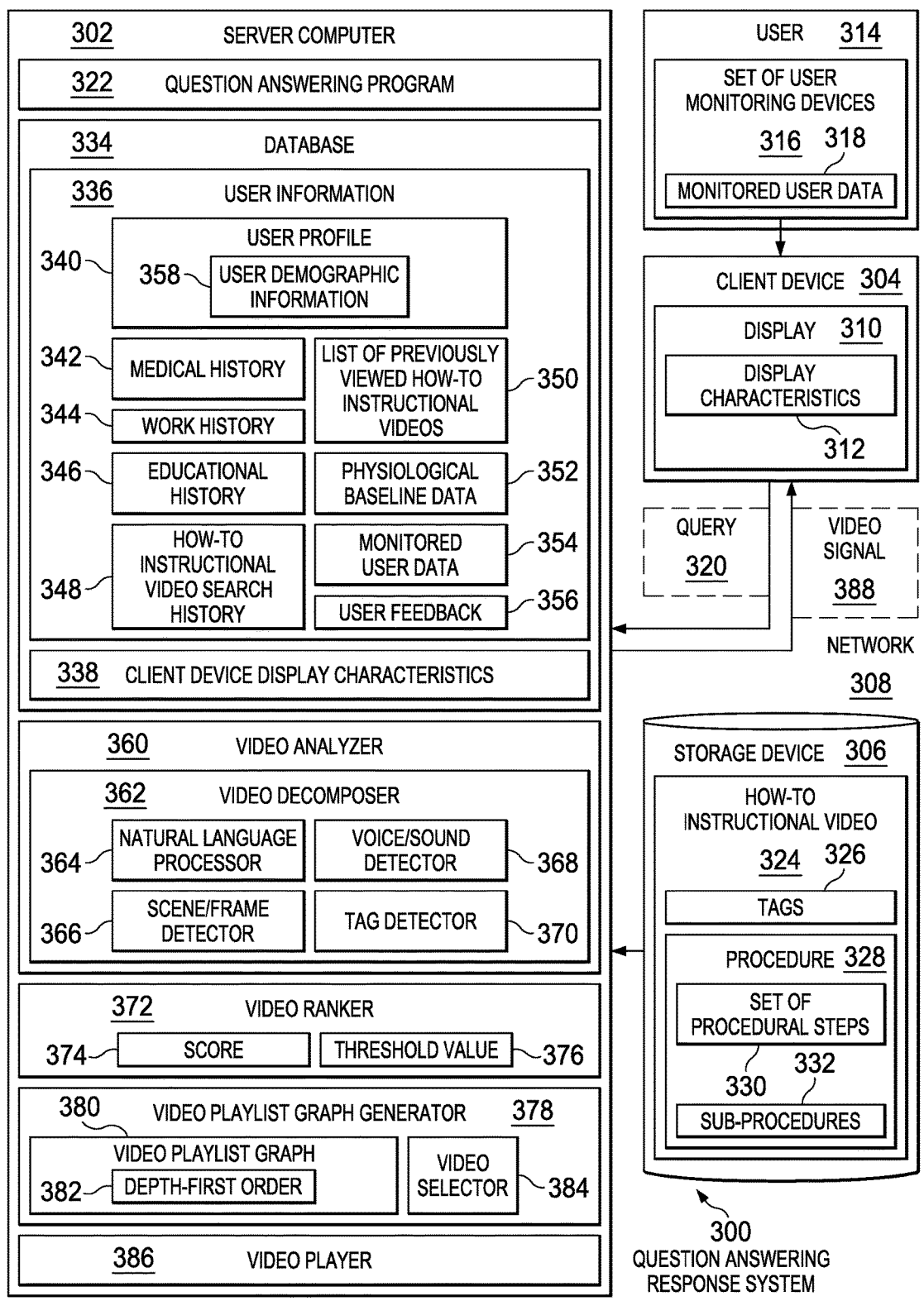
FIG. 3 is a diagram of an example of a question answering response system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide services to client devices connected to network 102. For example, server 104 and server 106 may provide question answering response services to users of registered client devices. A question answering response service is an artificial intelligence system that provides responses to how-to procedural questions using a set of one or more instructional videos selected for a particular client device user based on retrieved information corresponding to that particular client device user on a real-time basis.

Client device 110, client device 112, and client device 114 also connect to network 102. Client devices 110, 112, and 114 are registered clients to server 104 or server 106. In the depicted example, server 104 and server 106 may provide a set of instructional videos according to a depth-first ordering graph to client devices 110, 112, and 114. A depth-first ordering graph is a branching tree data structure that is searched starting at the root node and visiting each node as far as possible along one branch of the tree before backtracking to another branch. Server 104 and server 106 also may provide other information, such as boot files, operating system images, and software applications to client devices 110, 112, and 114.

In this example, client devices 110, 112, and 114 are computers, such as desktop computers or network computers with wire or wireless communication links to network 102. However, it should be noted that client devices 110, 112, and 114 are intended as examples only. In other words, client devices 110, 112, and 114 may include laptop computers, tablet computers, handheld computers, smart phones, personal digital assistants, and gaming systems, for example.

Storage 108 is a network storage device capable of storing data in a structured format or unstructured format. Storage 108 may provide storage of a plurality of different client device user names and associated identification numbers; user profiles; and user account information associated with the question answering response service. Storage 108 also may store artificial intelligence question answering programs; video analyzing programs; video playlist graphs, monitored user data, user feedback, and the like. An artificial intelligence question answering program is a software application capable of answering questions posed in natural language using natural language processing, information retrieval, knowledge representation, automated reasoning, and machine learning. Further, storage unit 108 may store other data, such as authentication or credential data that may include user names, passwords, and biometric data associated with the plurality of users and system administrators. It should be noted that storage unit 108 may store any data that may be utilized by the question answering response service.

In addition, it should be noted that network data processing system 100 may include any number of additional server devices, client devices, and other devices not shown. Program code located in network data processing system 100 may be stored on a computer readable storage medium and downloaded to a computer or other data processing device for use. For example, program code may be stored on a computer readable storage medium on server 104 and downloaded to client device 110 over network 102 for use on client device 110.

In the depicted example, network data processing system 100 may be implemented as a number of different types of communication networks, such as, for example, an internet, an intranet, a local area network (LAN), and a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores question answering program 218, database 220, video analyzer 222, and video playlist graph generator 224. Question answering program 218 is an artificial intelligence software application that provides a question answering response service to client device users. Database 220 may represent a set of one or more databases that store information, such as, for example, client device user information that may include a plurality of user profiles containing various data corresponding to a plurality of different client device users. It should be noted that even though database 220 is shown to be located in persistent storage 208 of data processing system 200, database 220 may be located remotely in one or more network storage devices, such as storage 108 in FIG. 1, connected to a network, such as network 102 in FIG. 1. In addition, data processing system 200 may have located and stored the data in database 220 by searching a plurality of other remote databases connected to the network using a Web crawler to find and retrieve the information regarding the plurality of different client device users.

Data processing system 200 utilizes video analyzer 222 to analyze and decompose how-to instructional videos. Video analyzer 222 may utilize, for example, natural language processing, tag detection, scene detection, sound detection, voice recognition, facial recognition, gesture recognition, object recognition, and text detection to decompose or segment a how-to instructional video into a set of two or more procedural steps corresponding to a procedure that is the subject of the how-to instructional video, such as, for example, how to change a flat tire on a particular year, make, and model vehicle. Data processing system 200 utilizes video playlist graph generator 224 to generate a tree graph of selected instructional videos that illustrate how to perform a particular procedure and any related instructional videos that illustrate how to perform one or more sub-procedures found within the particular procedure that a user is not familiar with based on information stored in database 220 corresponding to the user.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 226 is located in a functional form on computer readable media 228 that is selectively removable and may be loaded onto or transferred to data processing system 200 for running by processor unit 204. Program code 226 and computer readable media 228 form computer program product 230. In one example, computer readable media 228 may be computer readable storage media 232 or computer readable signal media 234. Computer readable storage media 232 may include, for example, an optical or magnetic disc that is inserted or placed into a drive or other device that is part of persistent storage 208 for transfer onto a storage device, such as a hard drive, that is part of persistent storage 208. Computer readable storage media 232 also may take the form of a persistent storage, such as a hard drive, a thumb drive, or a flash memory that is connected to data processing system 200. In some instances, computer readable storage media 232 may not be removable from data processing system 200.

Alternatively, program code 226 may be transferred to data processing system 200 using computer readable signal media 234. Computer readable signal media 234 may be, for example, a propagated data signal containing program code 226. For example, computer readable signal media 234 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 226 may be downloaded over a network to persistent storage 208 from another device or data processing system through computer readable signal media 234 for use within data processing system 200. For instance, program code stored in a computer readable storage media in a data processing system may be downloaded over a network from the data processing system to data processing system 200. The data processing system providing program code 226 may be a server computer, a client computer, or some other device capable of storing and transmitting program code 226.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 232 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that methods currently exist for matching simple how-to procedural questions to instructional videos. However, illustrative embodiments extend these currently existing solutions to question answering responses surrounding how-to procedural questions by using an automated video analysis of the most likely instructional videos for instructing a particular user on how to perform the procedure corresponding to a posed how-to procedural question. This video analysis automatically decomposes the instructional video into a series or sequence of procedural steps based on clues, such as, for example, audio clues, scene clues, and on textual clues, found within the instructional video being analyzed and other information, such as, for example, context of the requesting user while submitting the how-to procedural question to an illustrative embodiment, along with a current cognitive state and/or abilities of the requesting user.

For each procedural step associated with the procedure illustrated in a selected instructional video, illustrative embodiments make a determination as to whether or not the requesting user is likely to know how to perform each of the particular procedural steps based on retrieved information corresponding to the particular requesting user. For example, an instructional video on changing a flat tire may instruct a viewer to use a socket wrench to remove lug nuts from the tire rim. If illustrative embodiments determine that the requesting user has little likelihood of knowing how to use a socket wrench to remove the lug nuts based on information corresponding to the requesting user that is gathered by the illustrative embodiments, illustrative embodiments add another branch to the instructional video decomposition tree and search for a related instructional video on how to properly use the socket wrench. Illustrative embodiments continue to analyze each procedure and sub-procedure found within selected instructional videos to determine whether additional branches need to be added to the tree and other instructional videos searched for.

The result of the video analysis by illustrative embodiments produces a branching tree decomposition of the procedure that includes a set of instructional videos that illustrative embodiments play back in a particular sequence, which is determined by the original how-to procedural question submitted by the user and information gathered by the illustrative embodiments corresponding to the user. The user accesses a user interface on a network device to view the set of instructional videos. In response to a machine learning component of an artificial intelligence question answering program of illustrative embodiments ascertaining that a particular procedural step in the set of procedural steps, which will be shown to the user next, is likely to be a "mystery step" not easily understood by the user based on retrieved user information, illustrative embodiments may pause playing of the original instructional video and suggest to the user that the user watch a second instructional video explaining the mystery step prior to watching the rest of the original instructional video. Similarly, illustrative embodiments may insert machine learning pauses in the second instructional video, itself, suggesting additional instructional videos to instruct the user on sub-procedural steps. For example, using the flat tire changing example above, illustrative embodiments may pause the instructional video on how to properly use the socket wrench to remove the lug nuts and suggest to the user to view a different instructional video illustrating how to use a length of pipe to increase leverage when using the socket wrench to remove very tight or rusted lug nuts, and so on.

Illustrative embodiments also may assess a user's current cognitive state in real-time by receiving data from monitoring devices worn by the user, such as eye tracking devices or skin patches and bracelets that monitor physiological skin changes, such as temperature, perspiration, pH, and the like, to ascertain whether the user is ready or able to understand the next procedural step in the how-to instructional video sequence. In addition, illustrative embodiments may utilize other information, which may be located in the user's profile, that may affect the user's current cognitive state. For example, the user's profile may list medical conditions, such as autism or Alzheimer's disease, which may affect the user's ability to comprehend an instructional video, or may list medications currently taken by the user, which may cause drowsiness or brain fog.

Illustrative embodiments may base the "readiness" or "ability" of the user to understand the next procedural step in the how-to instructional video sequence on the user's previous experience, which illustrative embodiments may find in the user's profile, or on a level of distraction or general lack of attentiveness by the user, which illustrative embodiments may determine by receiving data from monitoring devices worn by the user. In the case of illustrative embodiments determining that the level of distraction of the user is above a predetermined threshold level or illustrative embodiments determine a lack of attentiveness by the user, illustrative embodiments decrease a confidence level in the user's ability to understand information on how to perform the procedural step, which is related to the current transient cognitive state of the user, and, as a result, illustrative embodiments may pause the original instructional video and play a second video until the confidence level of illustrative embodiments is increased equal to or greater than a predefined threshold level of confidence. This second video may not itself be instructional, but instead be unrelated to the original how-to procedural question submitted by the user to allow the user to regain or increase the level of cognitive vigor to understand the procedural step at hand. For example, the second video may show an amusing clip of puppies playing with a beach ball.

It should be noted that different groups of users, such as, for example, users with autism or users with Alzheimer's disease, may be able to assimilate procedural information with varying degrees of success. Also, the ability to assimilate procedural information may be time dependent, such as the time of day when viewing an instructional video (e.g., 2:00 a.m.). Even stress levels encountered during a day or an amount of sleep for a previous night, which illustrative embodiments may determine based on a user's electronic calendar, may be factors in a user's real-time ability to assimilate procedural information. In some sense, illustrative embodiments may help different groups of people with varying degrees of experience and cognitive states to understand and assimilate procedural information by illustrative embodiments having an ability to understand a user's query, to identify a how-to procedural task corresponding to the query, to provide recommendations on the procedural steps to perform during the task, and to determine which artificial intelligence programs to use based on a knowledge base including a plurality of procedures, artificial intelligence programs, and instructional videos. Further, illustrative embodiments may determine which set of artificial intelligence programs can work together to help a particular user accomplish a particular procedural task. If desired, a user may start to view an instructional video on one network device and finish viewing the instructional video on a different network device seamlessly. As a result, users by utilizing the illustrative embodiments may now finish complex, multi-step procedural tasks, without trial and error or information reentry. Furthermore, the type of network device used by the user may control the selection of instructional video segments in the branching tree graph. For example, some procedures may be harder to visualize on a network device with a small display screen or a network device not having the necessary processing power or available memory to display a particular instructional video. As a result, illustrative embodiments may select a different branch of the decomposed video tree based on the type and characteristics of the network client device being used by the user to view the set of selected instructional videos.

If a user has previously viewed a procedure in an instructional video and the user is now seeking to "review" or "refresh" such information regarding the procedure, illustrative embodiments take this cognitive aspect into consideration. Also, illustrative embodiments may take into consideration that different people have different talents and abilities, such as, for example, musical skills, athletic abilities, and manual dexterity, and utilize such information in selecting the appropriate instructional video for each different person.

Artificial intelligence planning technology, in particular hierarchy-based planners based on hierarchy task networks, such as, for example, Simple Hierarchical Ordered Planner 2 (SHOP2), offer a means of automatically assembling and customizing a "how-to" plan, which corresponds to a how-to procedural response to a user's query. Illustrative embodiments may adapt the how-to plan based on a user's context and goal for performing a procedure. For example, perhaps a user would like to learn how to cook a lasagna dish and submits a how-to procedural question to an illustrative embodiment. Then, the illustrative embodiment assembles a set of selected instructional videos for that particular user on how to cook the lasagna dish. However, at some point during the viewing of the set of instructional videos the user realizes that the user does not have any tomatoes for making the marinara sauce. At this point the hierarchy-based planner of the illustrative embodiment, re-plans and proposes to the user a how-to procedure for making pasticio (i.e., a Greek dish that resembles lasagna), but uses bechamel sauce instead of a tomato-based marinara sauce. In other words, the illustrative embodiment may modify the playlist of the selected set of instructional videos on-the-fly in real-time or near real-time. Moreover, the illustrative embodiment learns about user's capabilities, such as the user's cooking skills, and the cooking skills of those who are nearby him, such as, for example, family members, and assembles procedural "plans" that are context-aware and adapted to the cognitive abilities of the group of people and available artificial intelligence programs.

Thus, illustrative embodiments provide a computer implemented method, computer system, and computer program product for a question answering response system in which a user submits a question to the system and the system detects whether the question is a how-to procedural question or not. Based on determining that the submitted question is a how-to procedural question, the system performs an analysis of an instructional video that answers the how-to procedural question with a confidence level, which is above a predefined threshold confidence level value. Based on the analysis of the instructional video, the system determines the user's abilities to perform each procedural step in the instructional video based on retrieved information corresponding to the user, such as information in a user profile and monitored user data.

With reference now to FIG. 3, a diagram of an example of a question answering response system is depicted in accordance with an illustrative embodiment. Question answering response system 300 is a network of hardware and software components that provides a response to a how-to procedural question submitted by a client device user in the form of a set of instructional videos selected specifically for that particular user based on information corresponding to that particular user. Question answering response system 300 may be implemented in a network of data processing system, such as, for example, network data processing system 100 in FIG. 1.

In this illustrative example, question answering response system 300 includes server computer 302, client device 304, storage device 306, and network 308. However, illustrative embodiments are not limited to such. In other works, question answering response system 300 may include any number of server computers, client devices, storage devices, and networks. Server computer 302, client device 304, storage device 306, and network 308 may be, for example, server 104, client 110, storage 108, and network 102 in FIG. 1.

Server computer 302 provides a question answering response service to client device 304, which is connected to server computer 302 via network 308. Client device 304 includes display 310. Display 310 provides a means of displaying information. Display 310 has display characteristics 312. Display characteristics 312 define display 310's ability to display the information, such as screen size, screen resolution, color quality, et cetera.

User 314 uses client device 304 to submit a how-to procedural question to server computer 302. In this example, user 314 is wearing set of monitoring devices 316. Set of monitoring devices 316 monitor user 314 for clues as to user 314's current cognitive state. For example, set of monitoring devices 316 may monitor user 314 for rapid eye movements, which may indicate distraction, pupil dilation, which may indicate fear or stress, degree to which the eyes are closed, which may indicate drowsiness, and the like. Set of monitoring devices 316 may be a set of one or more monitoring devices that may include an eye tracking monitor, heart rate monitor, respiration rate monitor, temperature monitor, and/or skin monitor that are capable of monitoring the user for measurable physiological changes in user 314 indicating the current cognitive state of user 314. Set of monitoring devices 316 also may include a portable brain-wave monitor, such as, for example, a portable electroencephalogram (EEG) machine, which measures and records changes in electrical activity of a brain over a period of time indicating the current cognitive state of user 314. In other words, set of monitoring devices 316 may monitor user 314 for any type of physiological changes, such as, for example, neurophysiological, electrophysiological, and cognitive psychophysiological changes in user 314. Set of monitoring devices 316 generate monitored user data 318. Set of monitoring devices 316 are coupled to client device 304 by wireless and/or wire communication links. Set of monitoring devices 316 transmit monitored user data 318 to client device 304. Client device 304 sends monitored user data 318 to server computer 302. Server computer 302 may utilize monitored user data 318 to predict physiological changes in the user and other physiological changes, either subsequent, or unmeasured in the present, each indicating the current cognitive state of the user.

Query 320 is the how-to procedural question user 314 submitted to server computer 302 using client device 304. Server computer 302 receives query 320 and uses question answering program 322 to analyze query 320 to determine whether query 320 is a how-to procedural question. Question answering program 322 is an artificial intelligence software application that provides responses to how-to procedural questions specifically tailored to a particular requesting user, which in this example is user 314. Question answering program 322 may be, for example, question answering program 218 in FIG. 2.

Question answering program 322 provides a response to the how-to procedural question contained in query 320 in the form of a set of one or more instructional videos specifically selected by server computer 302 for user 314 based on information corresponding to user 314. The set of one or more instructional videos may be, for example, how-to instructional video 324, which is stored in storage device 306. How-to instructional video 324 includes tags 326, procedure 328, set of procedural steps 330, and sub-procedures 332. Server computer 302 may insert tags 326 into how-to instructional video 324 to identify branching points in the video, such as set of procedural steps 330 and sub-procedures 332. Alternatively, a video producer or a system administrator may insert tags 326 into how-to instructional video 324. Set of procedural steps 330 is a sequence of two or more steps that user 314 performs to complete procedure 328. Also, procedure 328 may include one or more sub-procedures 332. Sub-procedures 332 are one or more tasks within procedure 328 that may require a different skill set by user 314 to complete procedure 328.

Server computer 302 also includes database 334. Database 334 may be, for example, database 220 in FIG. 2. Database 334 also may represent one or more databases that store information, such as user information 336 and client device display characteristics 338. It should be noted that even though database 334 is shown to be located in server compute 302, alternative illustrative embodiments may locate database 334 in a set of one or more remote storage devices.

User information 336 is data corresponding to user 314. However, it should be noted that database 334 may store data corresponding to a plurality of different client device users. In this example, user information 336 includes user profile 340, medical history 342, work history 344, educational history 346, how-to instructional video search history 348, list of previously viewed how-to instructional videos 350, physiological baseline data 352, monitored user data 354, and user feedback 356. However, it should be noted that user information 336 may include more or less information than shown. Server computer 302 also may utilize user information 336, instead of or in addition to monitored user data 318, to predict physiological changes in the user indicating the current cognitive state of the user.

User profile 340 includes user demographic information 358. User demographic information 358 may include, for example, the age, gender, occupation, salary, and place of residence of user 314. User profile 340 also may include preferences of user 314, such as to how user 314 likes to view how-to instructional video 324 on a particular client device type with a minimum defined screen size having a particular screen resolution and color quality. In addition, user profile 340 may include work schedule, sleep schedule, interests, hobbies, family members, friends, co-workers, and the like of user 314.

Medical history 342 may include, for example, medical records from doctors' offices and/or hospitals, which server computer 302 may retrieve from other remote databases containing such records via network 308. Medical history 342 may include information that may affect the cognitive state of user 314, such as a diagnosed medical condition of user 314, medications taken by user 314, psychiatric evaluations of user 314, brain injuries sustained by user 314, general health of user 314, aptitude evaluations of user 314, and the like. Work history 344 may include previous and current jobs held by user 314, supervisory or managerial experience, skill levels, areas of expertise, years of experience, length of employment, and the like. Educational history 346 may include schools attended, major and minor areas of concentration, grades, honors, awards, and year of graduation, advanced degrees, and the like.

How-to instructional video search history 348 includes a history of what type of instructional videos user 314 has previously searched for and when the search was performed. List of previously viewed how-to instructional videos 350 includes a list of instructional videos previously viewed by user 314.

Physiological baseline data 352 may be generic baseline physiological baseline data relating to humans in general, which server computer 302 may have retrieved from remote databases storing such information. Alternatively, physiological baseline data may be specific to user 314. For example, user 314 may have previously trained set of monitoring devices 316 to collect baseline readings on user 314 prior to requesting how-to instructional information.

Question answering program 322 may utilize physiological baseline data 352 to compare with monitored user data 354 to determine a current cognitive state of user 314. Monitored user data 354 is monitored user data 318 of user 314 collected by set of user monitoring devices 316 and transmitted to server computer 302 by client device 304 via network 308. It should be noted that monitored user data 356 may represent monitored data for a plurality of different client device users.

User feedback 356 represents feedback supplied by user 314 to server computer 302. For example, while viewing how-to instructional video 324, user 314 may say "What is that?" or "I really don't understand this!" This vocalization by user 314 may be picked up by a sound detection device, such as a microphone, connected to client device 304 and transmitted to server computer 302. Alternatively, server computer 302 may insert one or more pop-up windows within how-to instructional video 324 requesting user 314 to input a response to "Do you understand this segment of the video?" or "Do you understand this particular procedural step in the procedure?" The input by user 314 may be a verbal input or a manual input, for example. User feedback 356 also may include a survey result submitted by user 314 after viewing how-to instructional video 324.

Client device display characteristics 338 are display characteristics 312 of display 310 in client device 304. However, it should be noted that database 334 may store display characteristics for a plurality of different client devices connected to network 308. Question answering program 322 may utilize client device characteristics 338 to assist question answering program 322 in determining which video segments or procedural steps to play in how-to instructional video 324 and in what order.

Question answering program 322 utilizes video analyzer 360 to decompose how-to instructional video 324 into set of procedural steps 330 and sub-procedures 332 of procedure 328. Video analyzer 360 may be, for example, video analyzer 222 in FIG. 2. Video analyzer 360 utilizes video decomposer 362 to decompose how-to instructional video 324 into set of procedural steps 330 and sub-procedures 332 of procedure 328. Video decomposer 362 utilizes natural language processor 364, scene/frame detector 366, voice/sound detector 368, and tag detector 370 to detect the different procedural steps and sub-procedures of procedure 328. Scene/frame detector 366 identifies changes in scenes or frames of a video and may include, for example, object recognition, facial recognition, and gesture recognition technology to detect the different procedural steps and sub-procedures of procedure 328. Voice/sound detector 368 identifies changes in voices and/or sounds in a video and may include, for example, voice recognition technology to detect the different procedural steps and sub-procedures of procedure 328. Tag detector 370 detects tags 326 inserted in how-to instructional video 324.

Question answering program 322 utilizes video ranker 372 to calculate score 374 for how-to instructional video 324. Score 374 may be, for example, a confidence score for how-to instructional video 324. A confidence score is a level of confidence value that indicates to question answering program 322 that how-to instructional video 324 is likely to instruct user 314 to perform procedure 328 properly at user 314's current cognitive state. Video ranker 372 compares score 374 with threshold value 376. Threshold value 376 may be, for example, a predefined confidence threshold level value, which score 374 must be equal to or greater than to provide question answering program 322 with the "confidence" that how-to instructional video 324 is likely to instruct user 314 to perform procedure 328 properly at user 314's current cognitive state.

Question answering program 322 utilizes video playlist graph generator 378 to generate video playlist graph 380 in depth-first order 382. Video playlist graph generator 378 may be, for example, video playlist graph generator 224 in FIG. 2. Video playlist graph 380 is a branching tree of a plurality of video nodes, each node in the tree containing a procedural step video segment or sub-procedure video segment illustrating a specific portion of procedure 328. Question answering program 322 starts at the root video node in the branching tree and then goes down each individual branch as far as possible visiting each video node in a particular branch before starting down a next branch in the tree. Video playlist graph generator 378 utilizes video selector 384 to select which how-to instructional videos to include in video playlist graph 380 for user 314. Video selector 384 presumable only selects how-to instructional videos with a generated score above threshold value 376, if any such how-to instructional videos current exist for the current cognitive state of user 314.

Server computer 302 utilizes video player 386 to play how-to instructional video 324 in depth-first order 382 based on video playlist graph 380 and, optionally, on client device display characteristics 338. While video player 386 plays how-to instructional video 324, server computer 302 transmits video signal 388 to client device 304 via network 308. Video signal 388 represents how-to instructional video 324 being played in depth-first order 382. Client device displays how-to instructional video to user 314 using display 310.

Figure 4:
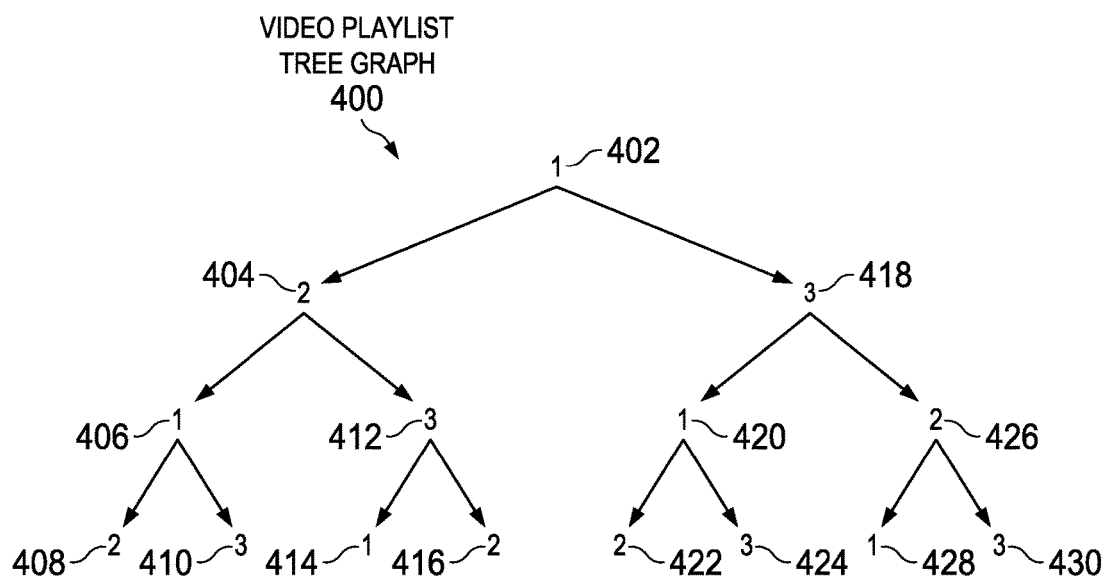
FIG. 4 is a diagram of an example of a video playlist tree graph in accordance with an illustrative embodiment.

With reference now to FIG. 4, a diagram of an example of a video playlist tree graph is depicted in accordance with an illustrative embodiment. Video playlist tree graph 400 may be, for example, video playlist graph 380 in FIG. 3. Video playlist tree graph 400 is in depth-first order, such as depth-first order 382 in FIG. 3.

A question answering program, such as, for example, question answering program 322 in FIG. 3, searches video playlist tree graph 400 by starting at the root video node and then searching down each individual branch as far as possible visiting each video node in a particular branch before starting down a next branch in the tree. In this example, the question answering program starts to play the video segment or procedural step corresponding to root video node 402-1. The question answering program then plays the video segments or procedural steps corresponding to video nodes 404-2, 406-1, and 408-2 in successive order. Afterward, the question answering program plays the video segment or procedural step corresponding to video node 410-3. Then, the question answering program plays the video segments or procedural steps corresponding to video nodes 412-3, 414-1, and 416-2. Subsequently, the question answering program plays the video segments or procedural steps corresponding to video nodes 418-3, 420-1, 422-2, 424-3, 426-2, 428-1, and 430-3 in that order. It should be noted that video playlist tree graph 400 is only intended as an example and not as a limitation on the different illustrative embodiments. In other words, video playlist tree graph 400 may include any number of video nodes and branches.

Figure 5B:
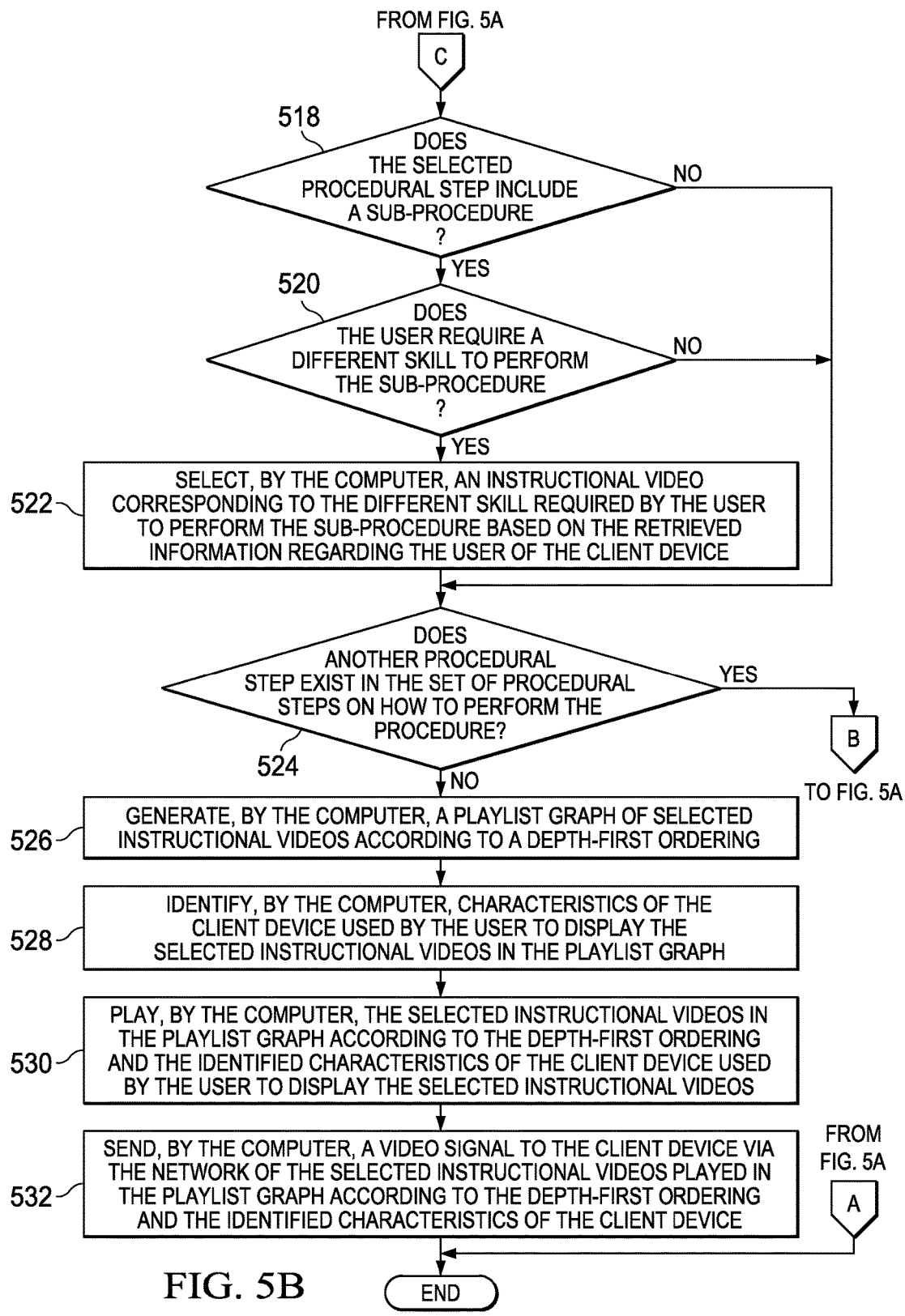

With reference now to FIGS. 5A-5B, a flowchart illustrating a process for generating a playlist graph of selected videos for a particular user is shown in accordance with an illustrative embodiment. The process shown in FIGS. 5A-5B may be implemented in a computer, such as data processing system 200 in FIG. 2.

The process begins when the computer receives a query from a user of a client device via a network (step 502). The query, the user, the client device, and the network may be, for example, query 320, user 314, client device 304, and network 308 in FIG. 3. Subsequent to receiving the query in step 502, the computer makes a determination as to whether the query is requesting information on how to perform a procedure (step 504). If the computer determines that the query is not requesting information on how to perform a procedure, no output of step 504, then the process terminates thereafter.

If the computer determines that the query is requesting information on how to perform a procedure, yes output of step 504, then the computer accesses a set of one or more instructional videos corresponding to the information on how to perform the procedure located in a set of one or more storage devices connected the network (step 506). The set of one or more instructional videos corresponding to the information on how to perform the procedure may be, for example, how-to instructional video 324 stored in storage device 306 in FIG. 3. In addition, the computer retrieves information regarding the user of the client device from at least one of a set of one or more databases and a set of one or more monitoring devices located on the user via the network (step 508). The information regarding the user of the client device may be, for example, user information 336 stored in database 334 in FIG. 3. The set of monitoring devices located on the user may be, for example, set of user monitoring devices 316 in FIG. 3.

Afterward, the computer selects an instructional video in the set of instructional videos corresponding to the information on how to perform the procedure based on the retrieved information regarding that particular user of the client device (step 510). Then, the computer analyzes the instructional video selected for the user that corresponds to the information on how to perform the procedure (step 512). The computer may utilize, for example, video analyzer 360 in FIG. 3 to analyze the instructional video. Further, the computer decomposes the instructional video selected for the user that corresponds to the information on how to perform the procedure into a set of procedural steps based on the analysis (step 514). The computer may utilize, for example, video decomposer 362 in FIG. 3 to decompose the instructional video into the set of procedural steps. The set of procedural steps may be, for example, set of procedural steps 330 in FIG. 3.

Subsequently, the computer selects a procedural step in the set of procedural steps on how to perform the procedure (step 516). Afterward, the computer makes a determination as to whether the selected procedural step includes a sub-procedure (step 518). If the computer determines that the selected procedural step does not include a sub-procedure, no output of step 518, then the process proceeds to step 524. If the computer determines that the selected procedural step does include a sub-procedure, yes output of step 518, then the computer makes a determination as to whether the user requires a different skill to perform the sub-procedure (step 520).

If the computer determines that the user does not require a different skill to perform the sub-procedure, no output of step 520, then the process proceeds to step 524. If the computer determines that the user does require a different skill to perform the sub-procedure, yes output of step 520, then the computer selects an instructional video corresponding to the different skill required by the user to perform the sub-procedure based on the retrieved information regarding the user of the client device (step 522). Subsequently, the computer makes a determination as to whether another procedural step exists in the set of procedural steps on how to perform the procedure (step 524).

If the computer determines that another procedural step does exist in the set of procedural steps on how to perform the procedure, yes output of step 524, then the process returns to step 516 where the computer selects another procedural step. If the computer determines that another procedural step does not exist in the set of procedural steps on how to perform the procedure, no output of step 524, then the computer generates a playlist graph of selected instructional videos according to a depth-first ordering (step 526). The playlist graph of selected instructional videos according to the depth-first ordering may be, for example, video playlist graph 382 having depth-first order 384 in FIG. 3.

In addition, the computer identifies characteristics of the client device used by the user to display the selected instructional videos in the playlist graph (step 528). The characteristics of the client device used by the user to display the selected instructional videos may be, for example, display characteristics 312 in FIG. 3. Further, the computer plays the selected instructional videos in the playlist graph according to the depth-first ordering and the identified characteristics of the client device used by the user to display the selected instructional videos (step 530). The computer may utilize, for example, video player 386 in FIG. 3, to play the selected instructional videos in the playlist graph. Furthermore, the computer sends a video signal to the client device via the network of the selected instructional videos played in the playlist graph according to the depth-first ordering and the identified characteristics of the client device (step 532). The video signal sent by the computer to the client device via the network may be, for example, video signal 388 in FIG. 3. Thereafter, the process terminates.

It should be noted that in an alternative embodiment, the computer may send the video playlist graph to the client device instead of or in addition to sending the video signal. In the alternative embodiment, the client device upon receiving the video playlist graph may play the selected instructional videos according to the depth-first ordering.

Figure 6A:
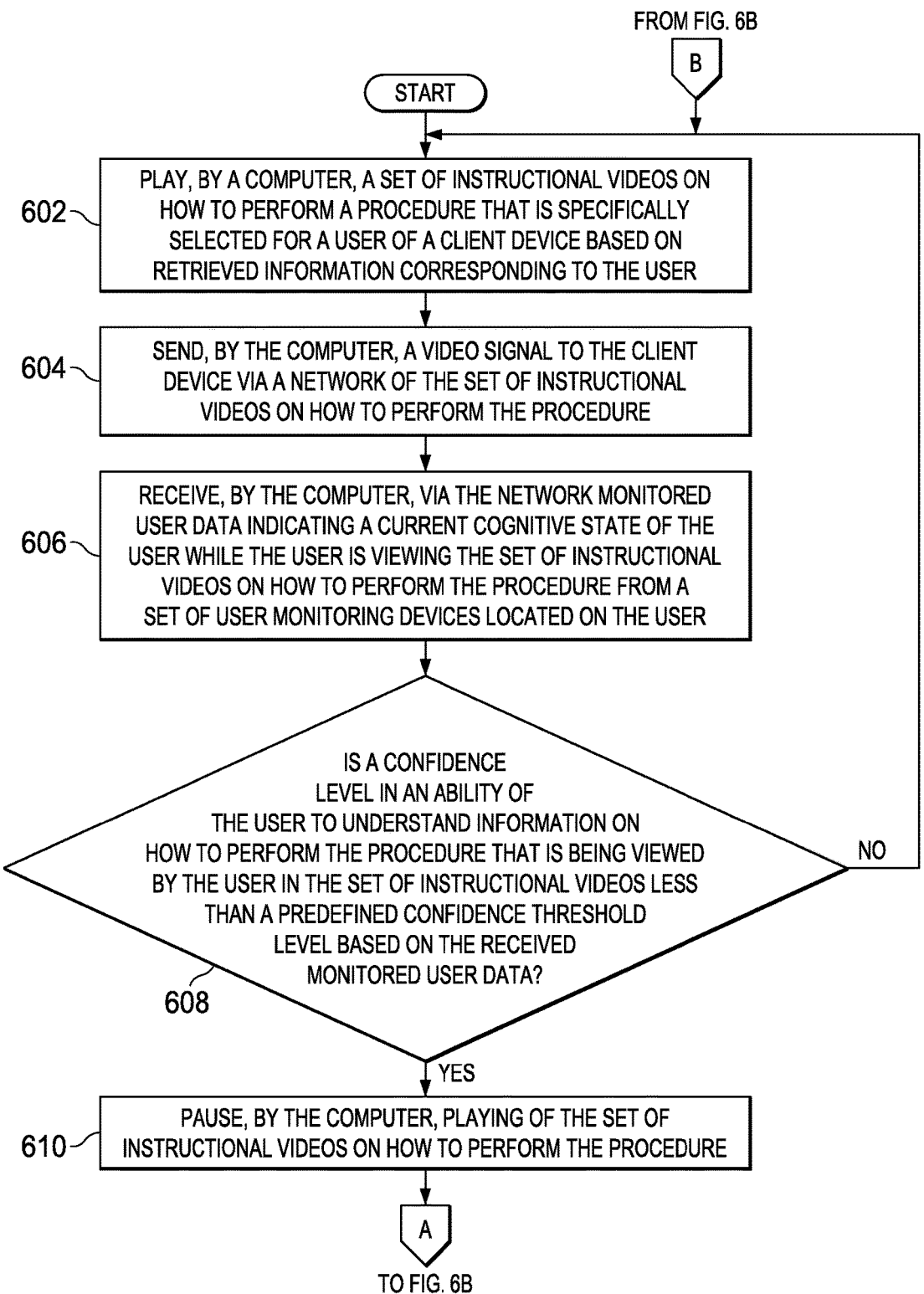
FIGS. 6A-6B are a flowchart illustrating a process for automatically pausing play of a how-to instructional video corresponding to information on how to perform a procedure and playing a video unrelated to the information on how to perform the procedure in accordance with an illustrative embodiment.
Figure 6B:
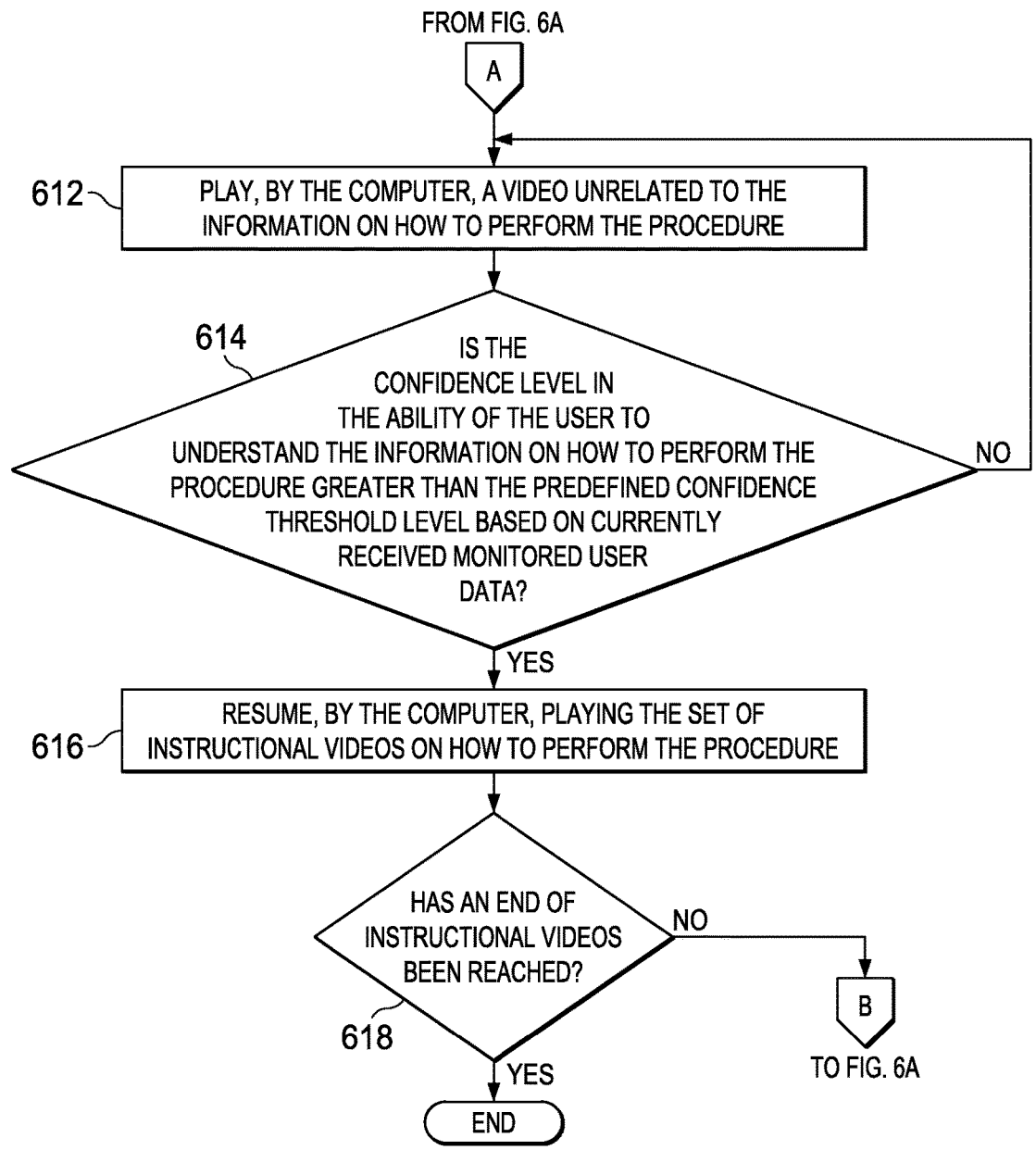

With reference now to FIGS. 6A-6B, a flowchart illustrating a process for automatically pausing play of a how-to instructional video corresponding to information on how to perform a procedure and playing a video unrelated to the information on how to perform the procedure is depicted in accordance with an illustrative embodiment. The process shown in FIGS. 6A-6B may be implemented in a computer, such as data processing system 200 in FIG. 2.

The process begins when the computer plays a set of instructional videos on how to perform a procedure that is specifically selected for a user of a client device based on retrieved information corresponding to the user (step 602). The set of one or more instructional videos on how to perform a procedure may be, for example, how-to instructional video 324 in FIG. 3. The user and the client device may be, for example, user 314 and client device 304 in FIG. 3.

In addition, the computer sends a video signal to the client device via a network of the set of instructional videos on how to perform the procedure (step 604). The video signal and network may be, for example, video signal 388 and network 308 in FIG. 3. Further, the computer receives, via the network, monitored user data indicating a current cognitive state of the user while the user is viewing the set of instructional videos on how to perform the procedure from a set of user monitoring devices located on the user (step 606). The monitored user data indicating the current cognitive state of the user and the set of user monitoring devices located on the user may be, for example, monitored user data 318 and set of user monitoring devices 316 in FIG. 3.

Afterward, the computer makes a determination as to whether a confidence level in an ability of the user to understand information on how to perform the procedure that is being viewed by the user in the set of instructional videos is less than a predefined confidence threshold level based on the received monitored user data (step 608). If the computer determines that the confidence level in the ability of the user to understand information on how to perform the procedure that is being viewed by the user in the set of instructional videos is not less than the predefined confidence threshold level based on the received monitored user data, no output of step 608, then the process returns to step 602 where the computer continues to play the set of instructional videos. If the computer determines that the confidence level in the ability of the user to understand information on how to perform the procedure that is being viewed by the user in the set of instructional videos is less than the predefined confidence threshold level based on the received monitored user data, yes output of step 608, then the computer pauses playing of the set of instructional videos on how to perform the procedure (step 610).

In addition, the computer plays a video unrelated to the information on how to perform the procedure (step 612). Subsequently, the computer makes a determination as to whether the confidence level in the ability of the user to understand the information on how to perform the procedure is greater than the predefined confidence threshold level based on currently received monitored user data (step 614). If the computer determines that the confidence level in the ability of the user to understand the information on how to perform the procedure is not greater than the predefined confidence threshold level based on the currently received monitored user data, no output of step 614, then the process returns to step 612 where the computer continues to play the video unrelated to the information on how to perform the procedure. If the computer determines that the confidence level in the ability of the user to understand the information on how to perform the procedure is greater than the predefined confidence threshold level based on the currently received monitored user data, yes output of step 614, then the computer resumes playing the set of instructional videos on how to perform the procedure (step 616).

Afterward, the computer makes a determination as to whether an end of the set of instructional videos has been reached (step 618). If the computer determines that the end of the set of instructional videos has not been reached, no output of step 618, then the process returns to step 602 where the computer continues to play the set of instructional videos. If the computer determines that the end of the set of instructional videos has been reached, yes output of step 618, then the process terminates thereafter.

Thus, illustrative embodiments provide a computer-implemented method, computer system, and computer program product for providing a question answering system that responses to a how-to procedural question using a set of instructional videos selected for a particular client device user based on retrieved information corresponding to that particular client device user. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for selecting an instructional video, the computer-implemented method comprising:
    determining, by a computer, that a query is requesting information on how to perform a procedure;
    accessing, by the computer, a set of instructional videos corresponding to the information on how to perform the procedure;
    retrieving, by the computer, information regarding a user of a client device that submitted the query requesting the information on how to perform the procedure, wherein the information regarding the user of the client device is retrieved from at least one of a set of databases and a set of monitoring devices located on the user via a network;
    predicting, by the computer, physiological changes in the user's current cognitive state based on the information regarding the user retrieved from the set of databases and the set of monitoring devices located on the user;
    selecting, by the computer, an instructional video in the set of instructional videos corresponding to the information on how to perform the procedure based on the user's current cognitive state indicated in the retrieved information regarding the user of the client device;
    analyzing, by the computer, the instructional video selected for the user that corresponds to the information on how to perform the procedure;
    decomposing, by the computer, the instructional video selected for the user that corresponds to the information on how to perform the procedure into a set of procedural steps based on the analyzing;
    responsive to the computer selecting a procedural step in the set of procedural steps on how to perform the procedure, determining, by the computer, whether the selected procedural step includes a sub-procedure;
    responsive to the computer determining that the selected procedural step does include a sub-procedure, determining, by the computer, whether the user requires a different skill to perform the sub-procedure; and
    responsive to the computer determining that the user requires the different skill to perform the sub-procedure, selecting, by the computer, an instructional video corresponding to the different skill required by the user to perform the sub-procedure based on the retrieved information regarding the user of the client device.

2. The computer-implemented method of claim 1, wherein the computer utilizes at least one of natural language processing, scene detection, sound detection, voice recognition, facial recognition, gesture recognition, object recognition, and tag detection to analyze and decompose the instructional video.

3. The computer-implemented method of claim 1, further comprising:
    generating, by the computer, a playlist graph of selected instructional videos according to a depth-first ordering.

4. The computer-implemented method of claim 3, further comprising:
    identifying, by the computer, characteristics of the client device used by the user to display the selected instructional videos in the playlist graph.

5. The computer-implemented method of claim 4, further comprising:
    playing, by the computer, the selected instructional videos in the playlist graph according to at least one of the depth-first ordering of the playlist graph and the identified characteristics of the client device used by the user to display the selected instructional videos; and
    sending, by the computer, a video signal to the client device via the network of the selected instructional videos played in the playlist graph according to the at least one of the depth-first ordering and the identified characteristics of the client device.

6. The computer-implemented method of claim 1, further comprising:
    responsive to the computer determining that a confidence level in an ability of the user to understand the information on how to perform the procedure in the instructional video is less than a predefined confidence level threshold based on received user data indicating the user's current cognitive state while the user is viewing the instructional video, pausing, by the computer, playing of the instructional video on how to perform the procedure; and playing, by the computer, a video unrelated to the information on how to perform the procedure until the computer determines that the confidence level in the ability of the user to understand the information on how to perform the procedure in the instructional video has risen above the predefined confidence level threshold.

7. The computer-implemented method of claim 6, further comprising:

responsive to the computer determining that the confidence level in the ability of the user to understand the information on how to perform the procedure in the instructional video is greater than the predefined confidence level threshold based on currently received user data, resuming, by the computer, the playing of the instructional video on how to perform the procedure.

8. A computer system for selecting an instructional video, the computer system comprising:

a bus system;

a storage device connected to the bus system, wherein the storage device stores program instructions; and a processor connected to the bus system, wherein the processor executes the program instructions to:

determine that a query is requesting information on how to perform a procedure;

access a set of instructional videos corresponding to the information on how to perform the procedure;

retrieve information regarding a user of a client device that submitted the query requesting the information on how to perform the procedure, wherein the information regarding the user of the client device is retrieved from at least one of a set of databases and a set of monitoring devices located on the user via a network;

predict physiological changes in the user's current cognitive state based on the information regarding the user retrieved from the set of databases and the set of monitoring devices located on the user;

select an instructional video in the set of instructional videos corresponding to the information on how to perform the procedure based on the user's current cognitive state indicated in the retrieved information regarding the user of the client device;

analyze the instructional video selected for the user that corresponds to the information on how to perform the procedure;

decompose the instructional video selected for the user that corresponds to the information on how to perform the procedure into a set of procedural steps based on the analysis;

determine whether a selected procedural step includes a sub-procedure in response to selecting the procedural step in the set of procedural steps on how to perform the procedure;

determine whether the user requires a different skill to perform the sub-procedure in response to determining that the selected procedural step does include a sub-procedure; and select an instructional video corresponding to the different skill required by the user to perform the sub-procedure based on the retrieved information regarding the user of the client device in response to determining that the user requires the different skill to perform the sub-procedure.

9. The computer system of claim 8, wherein the computer system utilizes at least one of natural language processing, scene detection, sound detection, voice recognition, facial recognition, gesture recognition, object recognition, and tag detection to analyze and decompose the instructional video.

10. A computer program product for selecting an instructional video, the computer program product comprising a computer readable storage medium having program instructions embodied therewith, the program instructions executable by a computer to cause the computer to perform a method comprising:

determining, by a computer, that a query is requesting information on how to perform a procedure;

accessing, by the computer, a set of instructional videos corresponding to the information on how to perform the procedure;

retrieving, by the computer, information regarding a user of a client device that submitted the query requesting the information on how to perform the procedure, wherein the information regarding the user of the client device is retrieved from at least one of a set of databases and a set of monitoring devices located on the user via a network;

predicting, by the computer, physiological changes in the user's current cognitive state based on the information regarding the user retrieved from the set of databases and the set of monitoring devices located on the user;

selecting, by the computer, an instructional video in the set of instructional videos corresponding to the information on how to perform the procedure based on the user's current cognitive state indicated in the retrieved information regarding the user of the client device;

analyzing, by the computer, the instructional video selected for the user that corresponds to the information on how to perform the procedure;

decomposing, by the computer, the instructional video selected for the user that corresponds to the information on how to perform the procedure into a set of procedural steps based on the analyzing;

responsive to the computer selecting a procedural step in the set of procedural steps on how to perform the procedure, determining, by the computer, whether the selected procedural step includes a sub-procedure;

responsive to the computer determining that the selected procedural step does include a sub-procedure, determining, by the computer, whether the user requires a different skill to perform the sub-procedure; and responsive to the computer determining that the user requires the different skill to perform the sub-procedure, selecting, by the computer, an instructional video corresponding to the different skill required by the user to perform the sub-procedure based on the retrieved information regarding the user of the client device.

11. The computer program product of claim 10, wherein the computer utilizes at least one of natural language processing, scene detection, sound detection, voice recognition, facial recognition, gesture recognition, object recognition, and tag detection to analyze and decompose the instructional video.

12. The computer program product of claim 10, further comprising:

generating, by the computer, a playlist graph of selected instructional videos according to a depth-first ordering.

13. The computer program product of claim 12, further comprising:

identifying, by the computer, characteristics of the client device used by the user to display the selected instructional videos in the playlist graph.

14. The computer program product of claim 13, further comprising:
playing, by the computer, the selected instructional videos in the playlist graph according to at least one of the depth-first ordering of the playlist graph and the identified characteristics of the client device used by the user to display the selected instructional videos; and
sending, by the computer, a video signal to the client device via the network of the selected instructional videos played in the playlist graph according to the at least one of the depth-first ordering and the identified characteristics of the client device.

\* \* \* \* \*